United States Patent
Morita et al.

(10) Patent No.: US 10,163,569 B2
(45) Date of Patent: *Dec. 25, 2018

(54) MULTILAYER CERAMIC CAPACITOR

(71) Applicant: TAIYO YUDEN CO., LTD., Taito-ku, Tokyo (JP)

(72) Inventors: Koichiro Morita, Takasaki (JP); Minoru Ryu, Takasaki (JP); Katsuya Taniguchi, Takasaki (JP); Yoshiki Iwazaki, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/456,962

(22) Filed: Mar. 13, 2017

(65) Prior Publication Data

US 2017/0365407 A1    Dec. 21, 2017

(30) Foreign Application Priority Data

Jun. 20, 2016    (JP) .................... 2016-122003

(51) Int. Cl.
*H01G 4/30*    (2006.01)
*H01G 4/232*   (2006.01)
(Continued)

(52) U.S. Cl.
CPC ............ *H01G 4/30* (2013.01); *H01G 4/012* (2013.01); *H01G 4/1227* (2013.01); *H01G 4/2325* (2013.01)

(58) Field of Classification Search
CPC ....... H01G 4/30; H01G 4/1227; H01G 4/1209
(Continued)

(56) References Cited

U.S. PATENT DOCUMENTS 4,086,649 A    4/1978    Hanold
5,910,881 A    6/1999    Ueno
(Continued)

FOREIGN PATENT DOCUMENTS

JP    H04320017 A    11/1992
JP    H104027 A      1/1998
(Continued)

OTHER PUBLICATIONS

Translation of JP2000331867A.*
(Continued)

*Primary Examiner* — Eric W Thomas
(74) *Attorney, Agent, or Firm* — Law Office of Katsuhiro Arai (57) ABSTRACT

A multilayer ceramic capacitor includes: a pair of external electrodes; a first internal electrode containing a base metal and coupled to one of the external electrodes; a dielectric layer stacked on the first internal electrode and containing a ceramic material and the base metal; and a second internal electrode stacked on the dielectric layer, containing the base metal, and coupled to another one of the external electrodes, wherein a concentration of the base metal in each of five regions is within ±20% of an average of the concentrations of the base metal in the five regions, the five regions being obtained by dividing a region from a location 50 nm away from the first internal electrode of the dielectric layer to a location 50 nm away from the second internal electrode of the dielectric layer in a stacking direction between the first and second internal electrodes equally into five.

7 Claims, 6 Drawing Sheets

(51) Int. Cl.
*H01G 4/012* (2006.01)
*H01G 4/12* (2006.01)

(58) Field of Classification Search
USPC ........................................................ 361/321.2
See application file for complete search history.

(56) References Cited

U.S. PATENT DOCUMENTS

| | | | |
|---|---|---|---|
| 6,205,014 | B1 | 3/2001 | Inomata et al. |
| 6,205,015 | B1 | 3/2001 | Wada et al. |
| 6,380,118 | B1 | 4/2002 | Harada et al. |
| 6,930,876 | B1 | 8/2005 | Noguchi et al. |
| 7,354,642 | B2 | 4/2008 | Shizuno et al. |
| 2003/0062112 | A1 | 4/2003 | Matsumoto |
| 2004/0229746 | A1 | 11/2004 | Park et al. |
| 2005/0122639 | A1 | 6/2005 | Okamatsu et al. |
| 2006/0208575 | A1 | 9/2006 | Orimo et al. |
| 2007/0203015 | A1 | 8/2007 | Tuan et al. |
| 2007/0223177 | A1 | 9/2007 | Ito et al. |
| 2010/0110608 | A1 | 5/2010 | Wei et al. |
| 2010/0165541 | A1 | 7/2010 | Sasabayashi et al. |
| 2011/0216472 | A1 | 9/2011 | Nakamura et al. |
| 2012/0147524 | A1 | 6/2012 | Okamoto et al. |
| 2012/0162858 | A1 | 6/2012 | Tanaka et al. |
| 2013/0094121 | A1* | 4/2013 | Endo ................. H01G 4/30 361/305 |
| 2013/0286541 | A1 | 10/2013 | Kawamoto |
| 2014/0307362 | A1 | 10/2014 | Kim et al. |
| 2015/0062775 | A1 | 3/2015 | Shibasaki et al. |
| 2015/0136462 | A1 | 5/2015 | Lee et al. |
| 2015/0340156 | A1 | 11/2015 | Masunari et al. |
| 2016/0293333 | A1* | 10/2016 | Kaneko ................. H01G 4/232 |
| 2017/0365405 | A1 | 12/2017 | Iwazaki et al. |
| 2017/0365406 | A1 | 12/2017 | Ryu et al. |
| 2017/0365408 | A1 | 12/2017 | Morita et al. |
| 2017/0365409 | A1 | 12/2017 | Morita et al. |
| 2017/0365410 | A1 | 12/2017 | Morita et al. |
| 2017/0365411 | A1 | 12/2017 | Taniguchi et al. |
| 2017/0365412 | A1 | 12/2017 | Taniguchi et al. |

FOREIGN PATENT DOCUMENTS

| | | | |
|---|---|---|---|
| JP | 2000331867 A | * | 11/2000 |
| JP | 2003173925 A | | 6/2003 |
| JP | 2006319205 A | | 11/2006 |
| JP | 2010232248 A | | 10/2010 |
| JP | 2012129508 A | | 7/2012 |
| JP | 5182531 B2 | | 1/2013 |

OTHER PUBLICATIONS

Final Office Action issued by U.S. Patent and Trademark Office, dated Oct. 15, 2018, for copending U.S. Appl. No. 15/456,991.
Final Office Action issued by U.S. Patent and Trademark Office, dated Oct. 15, 2018, for copending U.S. Appl. No. 15/457,026.
Final Office Action issued by U.S. Patent and Trademark Office, dated Oct. 15, 2018, for copending U.S. Appl. No. 15/457,337.

* cited by examiner

| | Ni CONCENTRATION IN DIELECTRIC LAYER | NUMBER OF UNIFORM LOCATIONS | MOST DEVIATED REGION | PERCENTAGE OF DEVIATION FROM AVERAGE | Ni CONCENTRATIONS IN GRAIN AND GRAIN BOUNDARY | NUMBER OF CAPACITANCE ANOMALIES (EXAMINED SAMPLES: 10000) | THICKNESS OF DIELECTRIC LAYER (μm) | NUMBER OF LAYERS | DETERMINATION |
|---|---|---|---|---|---|---|---|---|---|
| EXAMPLE 1 | UNIFORM | 5 | END PORTION 1 | +4% | EQUAL | 0 | 0.6 | 200 LAYERS | ◎ |
| EXAMPLE 2 | UNIFORM | 5 | END PORTION 1 | +5% | EQUAL | 0 | 1.0 | 200 LAYERS | ◎ |
| EXAMPLE 3 | UNIFORM | 5 | END PORTION 1 | +4% | EQUAL | 0 | 0.6 | 300 LAYERS | ◎ |
| EXAMPLE 4 | UNIFORM | 5 | END PORTION 1 | +7% | EQUAL | 0 | 1.0 | 300 LAYERS | ◎ |
| EXAMPLE 5 | UNIFORM | 5 | END PORTION 1 | +12% | UNEQUAL | 1 | 0.6 | 200 LAYERS | ○ |
| EXAMPLE 6 | UNIFORM | 4 | END PORTION 1 | +19% | UNEQUAL | 1 | 1.0 | 200 LAYERS | ○ |
| COMPARATIVE EXAMPLE 1 | NON-UNIFORM | 0 | END PORTION 1 | +32% | UNEQUAL | 17 | 0.6 | 200 LAYERS | × |
| COMPARATIVE EXAMPLE 2 | NON-UNIFORM | 0 | CENTRAL PORTION 3 | −39% | UNEQUAL | 26 | 1.0 | 200 LAYERS | × |
| COMPARATIVE EXAMPLE 3 | NON-UNIFORM | 0 | END PORTION 1 | +28% | UNEQUAL | 19 | 0.6 | 300 LAYERS | × |

MULTILAYER CERAMIC CAPACITOR

CROSS-REFERENCE TO RELATED APPLICATION

This application is based upon and claims the benefit of priority of the prior Japanese Patent Application No. 2016-122003, filed on Jun. 20, 2016, the entire contents of which are incorporated herein by reference.

FIELD

A certain aspect of the present invention relates to a multilayer ceramic capacitor.

BACKGROUND

To achieve small-sized large-capacity multilayer ceramic capacitors, dielectric layers have been thinned and the number of stacked dielectric layers has been increased. The design of dielectric layers that determine the characteristics of the multilayer ceramic capacitor is important. For example, disclosed is a technique that diffuses Ni into 3 to 30% of the distance between internal electrodes to improve the temperature characteristic of the capacitance (see Japanese Patent Application Publication No. 10-4027, for example).

However, in the above described technique, a base metal is not diffused in the middle portion of the dielectric layer in the stacking direction, and therefore, the concentration of the base metal may be partially high in the stacking direction. The part with a high concentration of the base metal decreases the permittivity of the dielectric layer.

SUMMARY OF THE INVENTION

According to an aspect of the present invention, there is provided a multilayer ceramic capacitor including: a pair of external electrodes; a first internal electrode that contains a base metal and is coupled to one of the pair of external electrodes; a dielectric layer that is stacked on the first internal electrode and contains a ceramic material and the base metal; and a second internal electrode that is stacked on the dielectric layer, contains the base metal, and is coupled to another one of the pair of external electrodes, wherein a concentration of the base metal in each of five regions is within ±20% of an average of the concentrations of the base metal in the five regions, the five regions being obtained by dividing a region of the dielectric layer equally into five in a stacking direction, the region of the dielectric layer being located from a location 50 nm away from the first internal electrode to a location 50 nm away from the second internal electrode in the stacking direction between the first internal electrode and the second internal electrode.

DETAILED DESCRIPTION

A description will be given of an embodiment with reference to the accompanying drawings.

Embodiment

Figure 1:
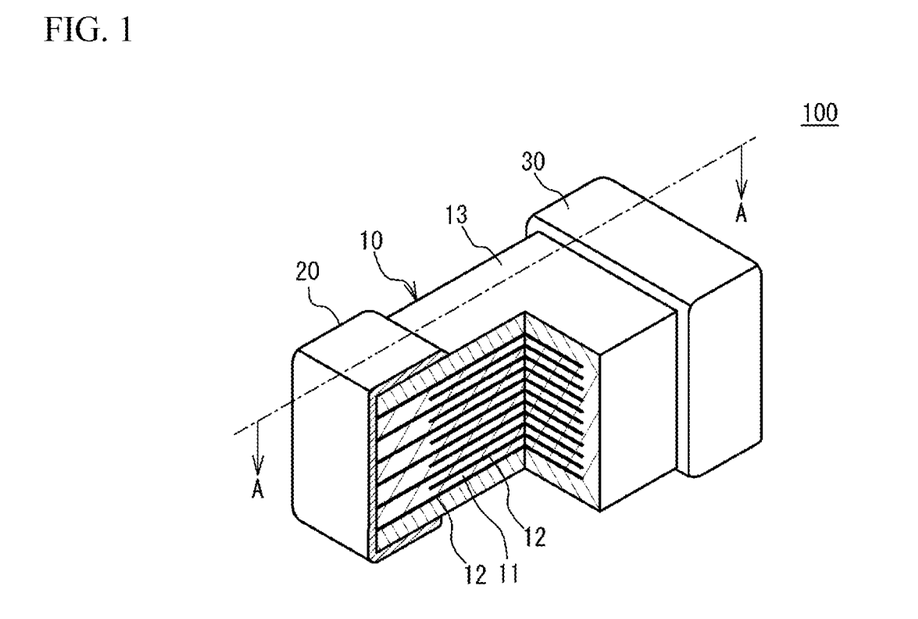
FIG. 1 is a partial cross-sectional perspective view of a multilayer ceramic capacitor.

A multilayer ceramic capacitor will be described. FIG. 1 is a partial cross-sectional perspective view of a multilayer ceramic capacitor 100. As illustrated in FIG. 1, the multilayer ceramic capacitor 100 includes a multilayer chip 10 having a rectangular parallelepiped shape, and external electrodes 20 and 30 that are located on opposing end faces of the multilayer chip 10.

The external electrodes 20 and 30 contain a base metal material. The multilayer chip 10 has a structure designed to have dielectric layers 11, which contain a ceramic material functioning as a dielectric, and internal electrode layers 12, which contain a base metal material, alternately stacked. The end edges of the internal electrode layers 12 are alternately exposed to the end face, on which the external electrode 20 is located, of the multilayer chip 10, and to the end face, on which the external electrode 30 is located, of the multilayer chip 10. Accordingly, the internal electrode layers 12 are alternately electrically coupled to the external electrode 20 and to the external electrode 30. This structure allows the multilayer ceramic capacitor 100 to have a structure in which a plurality of the dielectric layers 11 are stacked across the internal electrode layers 12. Additionally, in the multilayer chip 10, both end faces in the direction in which the dielectric layers 11 and the internal electrode layers 12 are stacked (hereinafter, referred to as the stacking direction) are covered with cover layers 13. The material of the cover layer 13 is, for example, the same as the material of the dielectric layer 11.

The multilayer ceramic capacitor 100 has, for example, a length of 0.2 mm, a width of 0.1 mm, and a height of 0.3 mm, or a length of 0.6 mm, a width of 0.3 mm, and a height of 0.3 mm, or a length of 1.0 mm, a width of 0.5 mm, and a height of 0.5 mm, or a length of 3.2 mm, a width of 1.6 mm, and a height of 1.6 mm, or a length of 4.5 mm, a width of 3.2 mm, and a height of 2.5 mm, but the dimensions are not limited to the above dimensions.

The external electrodes 20 and 30 and the internal electrode layer 12 are mainly composed of a base metal such as nickel (Ni), copper (Cu), or tin (Sn). The dielectric layer 11 is mainly composed of a ceramic material having a perovskite structure expressed by a general expression $ABO_3$. The perovskite structure includes $ABO_{3-\alpha}$ having an off-stoichiometric composition. The base metal contained in the internal electrode layer 12 is diffused into the dielectric layer 11 in the form of an oxidized material. Accordingly, the base metal is distributed in the dielectric layer 11. When the concentration of the base metal is partially high in the stacking direction in the dielectric layer 11, the permittivity decreases. Thus, in the following embodiment, a description will be given of a multilayer ceramic capacitor that can inhibit the decrease in permittivity. As an example, the embodiment will focus on Ni as the base metal contained in the internal electrode layer 12, and on $BaTiO_3$ (barium titanate) as the ceramic material with a perovskite structure contained in the dielectric layer 11.

Figure 2:
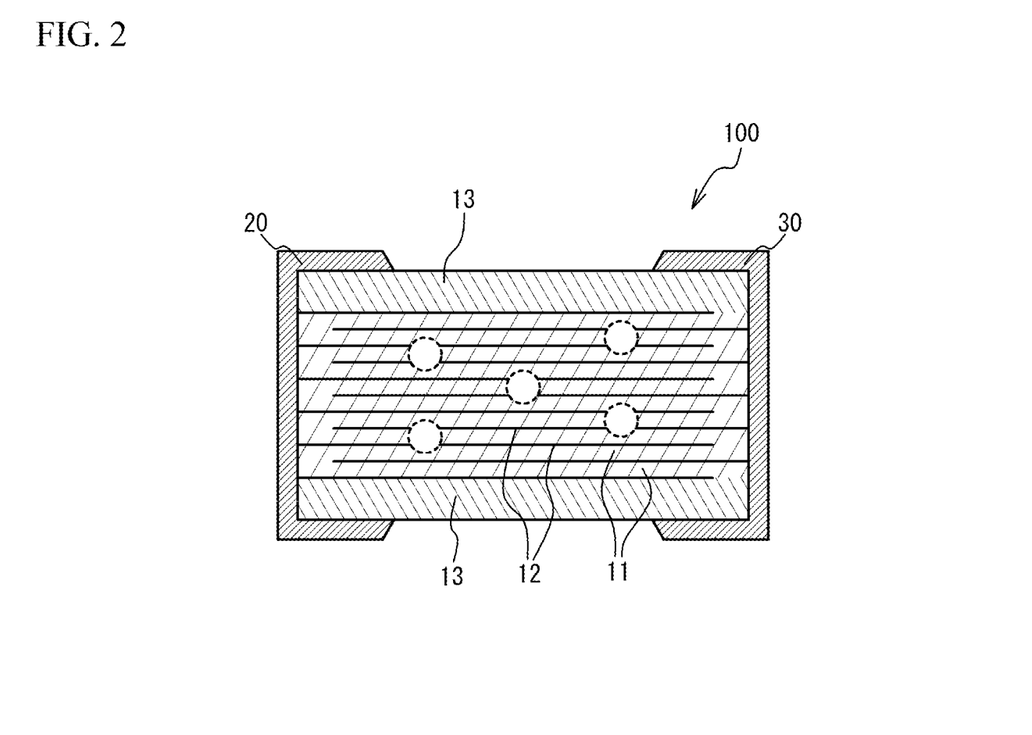
FIG. 2 is a cross-sectional view taken along line A-A in FIG. 1.

FIG. 2 is a cross-sectional view taken along line A-A in FIG. 1. The dielectric layer 11 sandwiched between two internal electrode layers 12, one of which is coupled to the external electrode 20 and the other of which is coupled to the external electrode 30, has a uniform Ni concentration in the stacking direction. Thus, the existence of the region partially having a high Ni concentration is inhibited in the dielectric layer 11. As a result, the decrease in permittivity of the dielectric layer 11 can be inhibited. In addition, the inhibition of the decrease in permittivity of the dielectric layer 11 stabilizes the capacitance of the multilayer ceramic capacitor 100 in which a plurality of the dielectric layers 11 are stacked. As a result, variability in capacitance among a plurality of the multilayer ceramic capacitors 100 can be reduced. As a result, reduced is a capacitance anomaly that the capacitance does not fall even within the lower 20% range of the normal distribution of the average capacitances of products and deviates from the normal distribution. As a result, the capacitance anomaly that the capacitance unexpectedly falls below the lower limit of the allowable limits of the capacitance can be reduced.

Figure 3:
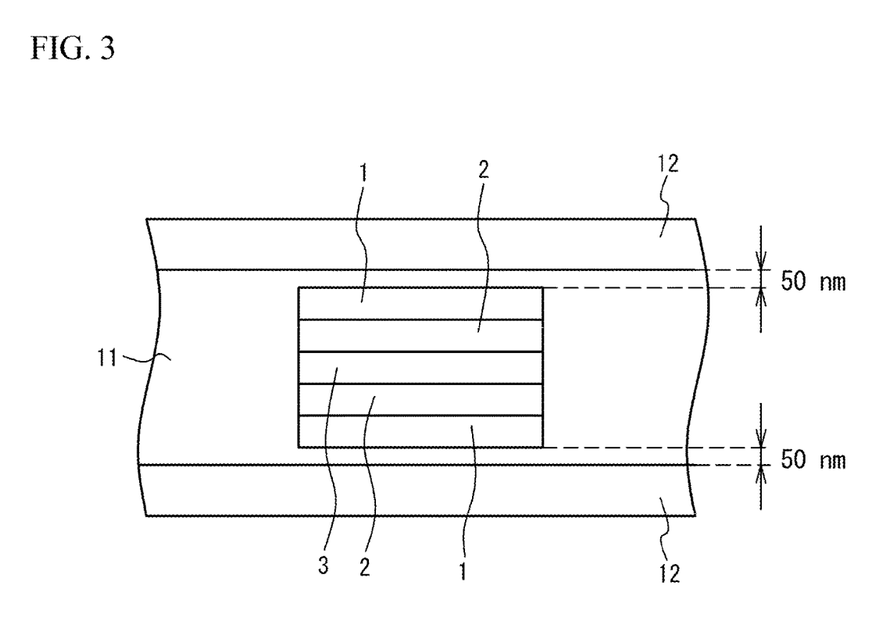
FIG. 3 is a partial enlarged view of FIG. 2.

Next, the term "uniform Ni concentration" will be described. FIG. 3 is a partial enlarged view of the cross-section of the multilayer ceramic capacitor 100, schematically enlarging any of areas indicated by circles in FIG. 2. Hatching is omitted. As illustrated in FIG. 3, in the stacking direction between opposing surfaces of two adjacent internal electrode layers 12, a region from a location 50 nm away from one of the internal electrode layers 12 to a location 50 nm away from the other of the internal electrode layers 12 is virtually divided into five equal regions. Two measurement regions closest to the internal electrode layers 12 are referred to as end portions 1, and the central measurement region is referred to as a central portion 3, and measurement regions between the end portions 1 and the central portion 3 are referred to as end portions 2. The Ni concentration of the dielectric layer 11 in the stacking direction between two adjacent internal electrode layers 12 is defined to be uniform when the Ni concentration in each of five measurement regions obtained by division into five equal regions is within ±20% of the average of the Ni concentrations in the five measurement regions. The reason for using the region located 50 nm away from the internal electrode layers 12 is because the reflection by Ni of the internal electrode layer 12 may prevent the accurate measurement. In addition, the width of the measurement region is made to be 1 to 1.5 times the thickness of the dielectric layer 11 in the stacking direction. The both end faces in the stacking direction of the dielectric layer 11 of each measurement region are located in a region where the two adjacent internal electrode layers 12 overlap with each other in plan view over the entire region. The two adjacent internal electrode layers here mean the electrodes producing a capacitance. That is, the two adjacent internal electrode layers are internal electrode layers one of which is coupled to the external electrode 20 and the other of which is coupled to the external electrode 30.

A description will next be given of a measurement method of the Ni concentration. The Ni concentration can be calculated by measuring the distribution of Ni atoms in the stacking direction of the dielectric layer 11. The distribution of Ni atoms can be measured with a transmission electron microscope or the like. For example, a TEM-EDS (TEM JEM-2100F manufactured by JEOL Ltd.), an EDS detector (JED-2300T manufactured by JEOL Ltd.) or the like can be used. Samples for the measurement can be made by mechanically polishing (polishing in a plane normal to the internal electrode layer) a reoxidized multilayer ceramic capacitor, and thinning the resulting multilayer ceramic capacitor by ion milling. For example, five samples with a thickness of 0.05 μm for five measurement regions may be made. If a sample that allows five measurement regions to be measured with the sample alone is made, the measurement that can reduce variations can be performed.

For example, a transmission electron microscope with a probe diameter of 1.5 nm scans and measures each measurement region over the entire range to measure the Ni concentration in each measurement region. To avoid the effect of variations in thickness of the sample, an atomic concentration ratio Ni/(Ba+Ti) is used as the Ni concentration. That is, the Ni concentration, i.e., the abundance ratio of Ni to (Ba+Ti), can be measured by measuring the abundance of Ni atoms, Ba atoms, and Ti atoms by a transmission electron microscope or the like. The tip portion of the internal electrode layer 12 and an anomalous point at which deposits aggregate in the dielectric layer 11 are excluded from the Ni concentration measurement. For example, a region having a size of 50 nm or greater, which contains a composition different from that of the parent phase, is excluded from the measurement regions. Such a location is, for example, a location in which compounds containing Si, compounds containing Mn, or compounds containing Ni—Mg aggregate to exist. Alternatively, such a location is a location where the abundance ratio of Ba and Ti is 90% or less.

For example, the count numbers of (Ni_Kα), (Ba_Lα), and (Ti_Kα) are obtained from an STEM-EDS spectrum, and are normalized by dividing them by respective sensitivity factors (respective k factors) used in the Cliff-Lorimer method. When the count number of (Ni_Kα)=I(Ni), the count number of (Ba_Lα)=I(Ba), and the count number of (Ti_Kα)=I(Ti), the Ni concentration={I(Ni)/k(Ni)}/{I(Ba)/k(Ba)+I(Ti)/k(Ti)}. Where k(Ni), k(Ba), and k(Ti) are sensitivity factors for normalization.

Then, based on the normalized values, the Ni concentration is calculated by the normalized value of (Ni_Kα)/{the normalized value of (Ba_Lα)+the normalized value of (Ti_Kα)}. In each region, the measurement is performed till the intensity of (Ba_Lα)±(Ti_Kα) exceeds 500,000 counts. The JED Series Analysis Program manufactured by JEOL Ltd. can be used to calculate the Ni concentration from the STEM-EDS spectrum.

When 80% or more of a plurality of the dielectric layers 11 stacked in the multilayer ceramic capacitor 100 have a uniform Ni concentration in the stacking direction, the Ni concentration of the overall dielectric layer in the stacking direction of the multilayer ceramic capacitor 100 is defined to be uniform. For example, as indicated by circles in FIG. 2, when the Ni concentrations of at least four dielectric layers 11 out of five dielectric layers 11 located in different locations in the stacking direction are uniform, it can be judged that 80% or more of the dielectric layers 11 have a uniform Ni concentration. In the multilayer ceramic capacitor 100, when the Ni concentrations of the dielectric layers 11 located in different locations in the stacking direction are uniform, the capacitance of the multilayer ceramic capacitor 100 stabilizes. Accordingly, variability in capacitance among a plurality of the multilayer ceramic capacitors 100 can be reduced. Therefore, reduced is a capacitance anomaly that the capacitance does not fall even within the lower 20% range of the normal distribution of the average capacitances of products and deviates from the normal distribution.

It is preferable that when 90% or more of a plurality of the dielectric layers 11 stacked in the multilayer ceramic capacitor 100 have a uniform Ni concentration in the stacking direction, the Ni concentration of the overall dielectric layer in the stacking direction of the multilayer ceramic capacitor 100 is defined to be uniform. For example, as indicated by circles in FIG. 2, when all the Ni concentrations of five dielectric layers 11 located in different locations in the stacking direction are uniform, it can be judged that 90% or more of the dielectric layers 11 have a uniform Ni concentration.

Figure 4:
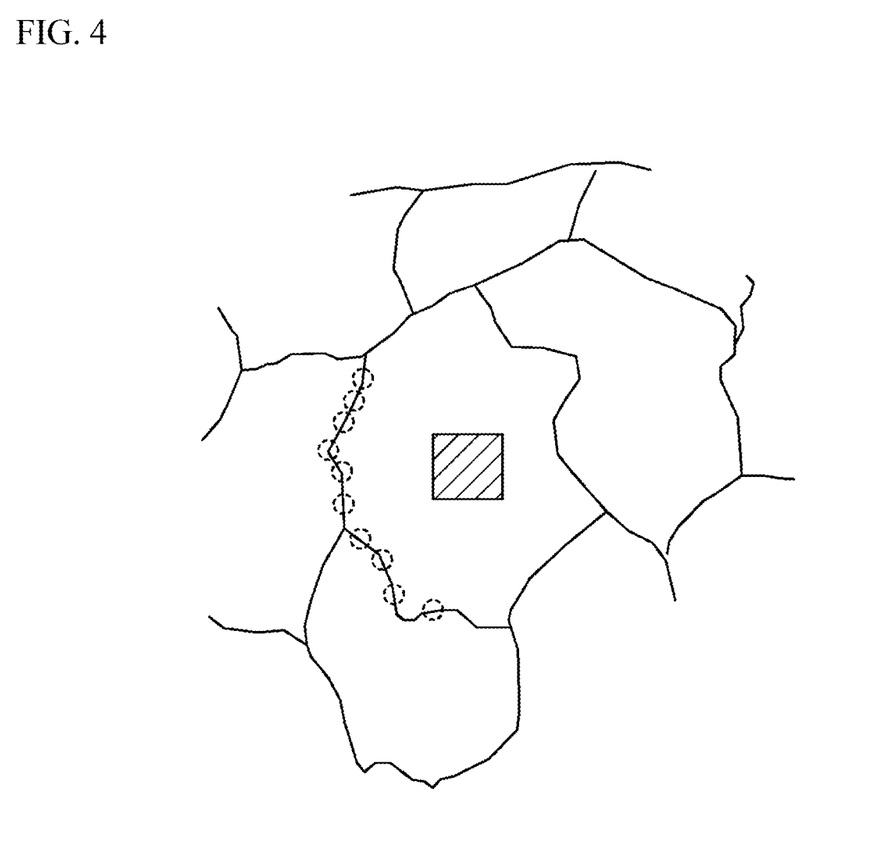
FIG. 4 illustrates crystal grains and a crystal grain boundary.

When a crystal grain boundary exists in the above five measurement regions, the Ni concentration in a crystal grain and the Ni concentration of the crystal grain boundary adjacent to the crystal grain are preferably equal to each other. In this case, variations in Ni concentration, which tends to be segregated in the crystal grain boundary, are reduced, and the Ni concentration in the stacking direction of the dielectric layer 11 can be made to be further uniform. For example, as illustrated in FIG. 4, in a crystal grain, the Ni concentration can be measured by scanning a target region in a 50-nm square area (a hatched part in FIG. 4) by a transmission electron microscope or the like using the above-described measurement method. In a crystal grain boundary, using the above-described method, for example, ten points (points indicated by circles in FIG. 4) on the crystal grain boundary adjacent to the crystal grain are measured with a 1.5 nm probe, and the average of the obtained Ni concentrations can be measured as the Ni concentration of the crystal grain boundary. When the Ni concentration in the crystal grain is within ±20% of the Ni concentration of the crystal grain boundary, both the Ni concentrations are defined to be equal to each other.

As illustrated in FIG. 2, when the Ni concentration in a crystal grain and the Ni concentration of the crystal grain boundary adjacent to the crystal grain are equal in 80% or more of a plurality of the dielectric layers 11 stacked in the multilayer ceramic capacitor 100, the Ni concentration in a crystal grain and the Ni concentration of the crystal grain boundary adjacent to the crystal grain are defined to be equal across the multilayer ceramic capacitor 100. For example, as illustrated in FIG. 2, when the Ni concentration in a crystal grain and the Ni concentration of the crystal grain boundary adjacent to the crystal grain are equal in at least four out of five dielectric layers 11 located in different locations in the stacking direction, it can be judged that the Ni concentration in a crystal grain and the Ni concentration of the crystal grain boundary adjacent to the crystal grain are equal in 80% or more of a plurality of the dielectric layers 11. When the Ni concentration in a crystal grain and the Ni concentration of the crystal grain boundary adjacent to the crystal grain are equal across the multilayer ceramic capacitor 100, the capacitance of the multilayer ceramic capacitor 100 further stabilizes. Accordingly, variability in capacitance among a plurality of the multilayer ceramic capacitors 100 can be further reduced. Therefore, reduced is a capacitance anomaly that the capacitance does not fall even within the lower 20% range of the normal distribution of the average capacitances of products and deviates from the normal distribution. Abnormal locations (for example, locations at which many segregations are aggregated), which seem evidently not to typify the product or the lot subjected to the measurement, are excluded from the measurement locations, and the segregation locations in which a secondary phase exists are excluded from the measurement. For example, a region having a size of 50 nm or greater, which contains a composition different from that of the parent phase, is not employed as a measurement region. Examples of such locations are locations in which compounds containing Si, compounds containing Mn, or compounds containing Ni—Mg are aggregated to exist. Another example of such locations is a location where the abundance ratio of Ba and Ti is 90% or less.

The dielectric layer 11 has been described as having a uniform Ni concentration in the stacking direction, but the Ni concentration in the dielectric layer 11 is approximately, for example, from 0.015 to 0.045.

To further inhibit the occurrence of the capacitance anomaly, it is preferable that the Ni concentration of the dielectric layer 11 in the stacking direction between two adjacent internal electrode layers 12 is defined to be uniform when the Ni concentration in each of the above five measurement regions is preferably within ±10%, more preferably within ±5% of the average of the Ni concentrations in the five measurement regions. In addition, the above description has focused attention on $BaTiO_3$ as a dielectric and on Ni as a base metal, but does not intend to suggest any limitation. Since the permittivity decreases if other dielectrics also have a region in which the concentration of the base metal is partially high, the above-described embodiment can be applied to other dielectrics and other base metals.

Figure 5:
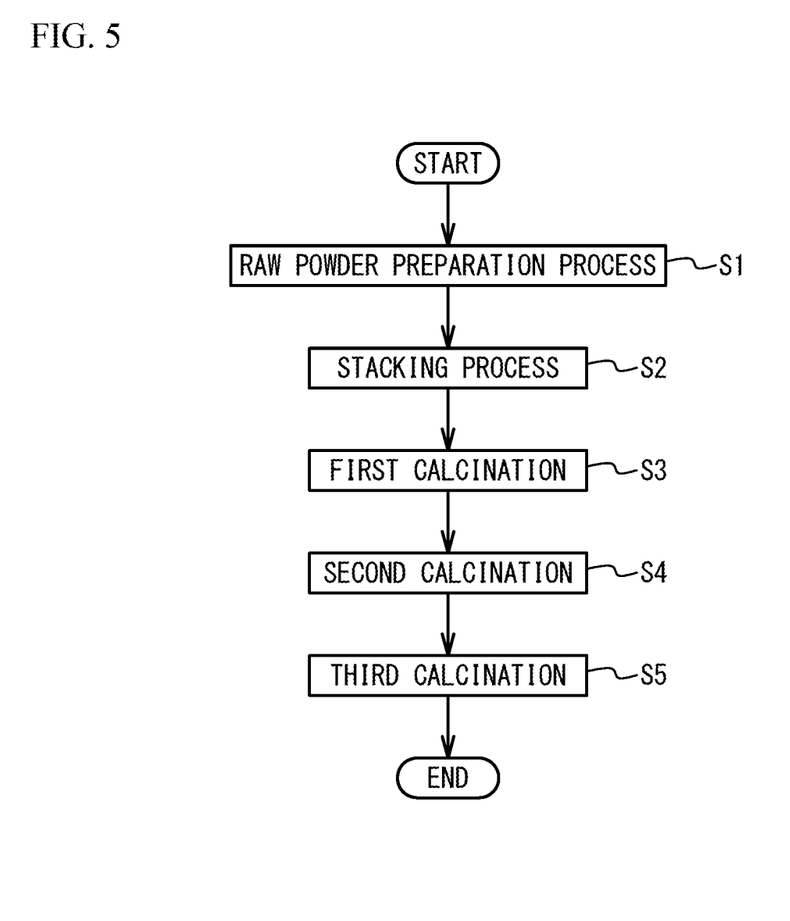
FIG. 5 is a flowchart illustrating a method of manufacturing the multilayer ceramic capacitor.

A description will next be given of a manufacturing method of the multilayer ceramic capacitor 100. FIG. 5 is a flowchart illustrating a method of manufacturing the multilayer ceramic capacitor 100.

Raw Powder Preparation Process

First, as illustrated in FIG. 5, raw powder for forming the dielectric layer 11 is prepared. Ba and Ti contained in the dielectric layer 11 are normally contained in the dielectric layer 11 in the form of a sintered compact of particles of $BaTiO_3$. $BaTiO_3$ is a tetragonal compound having a perovskite structure, exhibiting a high permittivity. $BaTiO_3$ is normally obtained by reacting a titanium raw material such as titanium dioxide with a barium raw material such as barium carbonate to synthesize barium titanate. There have been known many kinds of methods such as, for example, the solid phase method, the sol-gel method, and the hydrothermal method as a method of synthesizing $BaTiO_3$. The present embodiment can employ any of these methods.

Specified additive compounds may be added to the resulting ceramic powder according to the purpose. The examples of the additive compounds include Mg, Mn, V, Cr, oxidation materials of rare-earth elements (Y, Dy, Tm, Ho, Tb, Yb, and Er), and oxidation materials of Sm, Eu, Gd, Co, Li, B, Na, K, and Si, or glass.

In the present embodiment, preferably, a compound containing an additive compound is mixed with particles of $BaTiO_3$, and the resulting mixture is calcined at 820 to 1150° C. Then, the resulting particles of $BaTiO_3$ are wet blended with the additive compound, dried, and ground to prepare ceramic powder. For example, the particles of $BaTiO_3$ obtained by the above described method and used to manufacture the multilayer ceramic capacitor 100 of the present embodiment preferably have an average particle size of 50 to 150 nm to make the dielectric layer 11 thinner. For example, the particle size of the ceramic powder obtained as described above may be adjusted by grinding treatment as necessary, or may be controlled in combination with a classification treatment.

Stacking Process

Next, a binder such as polyvinyl butyral (PVB) resin, an organic solvent such as ethanol or toluene, and a plasticizer such as dioctyl phthalate (DOP) are added to the resulting ceramic powder and wet-blended. With use of the resulting slurry, a strip-shaped dielectric green sheet with a thickness of 0.8 μm or less is coated on a base material by, for example, a die coater method or a doctor blade method, and then dried.

Then, a conductive metal paste containing an organic binder is printed on the surface of the dielectric green sheet by screen printing or gravure printing to arrange a pattern of internal electrode layers alternately led out to a pair of external electrodes of different polarizations. For the metal of the conductive metal paste, used is Ni with a purity of 99% or greater. $BaTiO_3$ with an average particle size of 50 nm or less may be homogeneously distributed as a co-material into the conductive metal paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers are alternately exposed to both end faces in the length direction of the dielectric layer so as to be alternately led out to a pair of external electrodes of different polarizations.

Cover sheets, which are to be the cover layers 13, are pressed to be bonded at the top and bottom of the stacked dielectric green sheets, and cut into a predetermined chip size (for example, 1.0×0.5 mm). This process allows the molded body of the multilayer chip 10 to be obtained.

First Calcination Process

The molded body of the multilayer chip 10 obtained as described above is debindered in an $N_2$ atmosphere, at 250 to 500° C., and is then calcined in a reducing atmosphere (with an oxygen partial pressure of $10^{-5}$ to $10^{-7}$ Pa), at 1100 to 1300° C. for ten minutes to two hours. This process causes the compounds constituting the dielectric green sheets to be sintered, growing grains of the compounds. In this manner, obtained is the multilayer ceramic capacitor 100 including the multilayer chip 10 formed of the dielectric layers 11 and the internal electrode layers 12 that are made of a sintered compact and alternately stacked thereinside, and the cover layers 13 formed as the outermost layers at the top and the bottom in the stacking direction.

Second Calcination Process

Then, second calcination is performed as a heat treatment for diffusing Ni in the internal electrode layer 12 into the dielectric layer 11. The multilayer ceramic capacitor 100 is heat treated at 1000 to 1200° C., which is lower than the temperature of the first calcination by 50 to 100° C., at an oxygen partial pressure of $10^{-3}$ to $10^{-6}$ Pa for about two to four hours. The calcination at an oxygen partial pressure higher than that of the first calcination facilitates oxidation of Ni, and sufficiently diffuses Ni into the dielectric layer 11. On the other hand, since the temperature is lower than that of the first calcination, grain growth in the dielectric layer 11 is inhibited. Accordingly, the dielectric layer 11 is to have a uniform Ni concentration in the stacking direction.

Third Calcination Process

Then, as reoxidation calcination, performed is third calcination (a reoxidation treatment) at 600 to 1000° C., at an oxygen partial pressure of $10^{-2}$ to 10 Pa for about one hour. In the third calcination process, since the oxygen partial pressure is high, Ni is oxidized, but the Ni concentration in the dielectric layer 11 does not change because the calcination temperature range is lower than that of the second calcination process.

When the temperature and time for calcination are insufficient, the diffusion of Ni may become inhomogeneous. Thus, the temperature and time of the calcination reaction are preferably appropriately adjusted depending on the component size and the number of stacked layers. The external electrodes 20 and 30 may be formed by, for example, calcining the multilayer chip 10 formed by stacking the dielectric layers 11 and the internal electrode layers 12, and then baking a conductive paste on both end portions of the multilayer chip 10. Alternatively, the conductive paste may be applied before the second calcination, and baked simultaneously at the time of the second calcination. The external electrodes may be thickly formed on both end faces of the multilayered body by sputtering.

In addition to the above-described manufacturing method, Ni can be homogeneously formed in the dielectric layer 11 by adding NiO to slurry when the slurry is formed. Alternatively, a method that diffuses Ni into the dielectric layer from the internal electrode by adding NiO to slurry and then performing the above-described second calcination process may be employed.

EXAMPLES

The multilayer ceramic capacitors in accordance with the embodiment were made to examine the characteristics.

Examples 1 to 6

The multilayer ceramic capacitors 100 were made in accordance with the manufacturing method in accordance with the above-described embodiment. Table 1 lists the structure common to examples 1 to 6. The external electrodes 20 and 30 are formed on both end portions of the multilayer chip 10, and have a structure including a Cu portion (with a thickness of 22 μm), a Ni portion (with a thickness of 2 μm) formed on the Cu portion by plating, and an Sn portion (with a thickness of 6 μm) formed on the Ni portion by plating. The central portion 3 of the multilayer ceramic capacitor 100 was cut by ion milling so that the cross-section illustrated in FIG. 2 was exposed, and the exposed cross-section was photographed by a scanning electron microscope (SEM). Then the thicknesses of the dielectric layer 11 and the internal electrode layer 12, i.e., the dimensions in the stacking direction, were measured based on the resulting photo. An SEM photo was taken so that the view angle of the SEM photo was 10 to 30 μm in both length and width, and the thicknesses of the dielectric layer 11 and the internal electrode layer 12 were measured at several locations located every 3 μm. Then, the averages of the measured thicknesses were calculated as the thicknesses of the dielectric layer 11 and the internal electrode layer 12. Twenty locations were measured in different five fields of view to obtain 100 sets of data, and the averages of them were specified to be the thicknesses of the dielectric layer 11 and the internal electrode layer 12.

TABLE 1

| | |
|---|---|
| Dimensions (mm) Length × Width × Height | 1.0 × 0.5 × 0.5 |
| Thickness of the internal electrode | 0.8 μm |
| Thickness of the external electrode (including plating) | 30 μm |
| Relative permittivity | 2000 to 4800 |

In the examples 1, 3, and 5, the thickness of the dielectric layer was made to be 0.6 μm. In the examples 2, 4, and 6, the thickness of the dielectric layer was made to be 1.0 μm. In the examples 1, 2, 5, and 6, the number of the dielectric layers stacked was made to be 200. In the examples 3 and 4, the number of the dielectric layers stacked was made to be 300.

In the examples 1 to 4, in the first calcination process, the molded body of the multilayer chip 10 was debindered in an $N_2$ atmosphere, at 250 to 500° C., and then calcined in a reducing atmosphere with an oxygen partial pressure of $5.0 \times 10^{-6}$ Pa, at 1200° C. for one hour to cause the compounds constituting the dielectric green sheets to be sintered to grow grains of the compounds. Then, in the second calcination process, the multilayer ceramic capacitor 100 was calcined in a reducing atmosphere with an oxygen partial pressure of $7.0 \times 10^{-5}$ Pa, at 1100° C., which is 100° C. lower than the temperature of the first calcination process, for three hours to diffuse Ni in the internal electrode into the dielectric layer. Then, the third calcination process was performed.

In the examples 5 and 6, in the first calcination process, the molded body of the multilayer chip 10 was debindered in an $N_2$ atmosphere, at 250 to 500° C., and then calcined in a reducing atmosphere with an oxygen partial pressure of $5.0 \times 10^{-6}$ Pa, at 1200° C. for one hour to cause the compounds constituting the dielectric green sheets to be sintered to grow grains of the compounds. Then, in the second calcination process, the multilayer ceramic capacitor 100 was calcined in a reducing atmosphere with an oxygen partial pressure of $5.0 \times 10^{-5}$ Pa, at 1100° C., which is 100° C. lower than the temperature of the first calcination process, for two hours to diffuse Ni in the internal electrode into the dielectric layer. Then, the third calcination process was performed.

In comparative examples 1 to 3, in the first calcination process, the molded body of the multilayer chip 10 was debindered in an $N_2$ atmosphere, at 250 to 500° C., and then calcined in a reducing atmosphere with an oxygen partial pressure of $5.0 \times 10^{-6}$ Pa, at 1200° C. for one hour to cause the compounds constituting the dielectric green sheet to be sintered to grow grains of the compounds. Then, the second calcination process was skipped and the third calcination process was performed.

Ten thousand samples were made for each of the examples 1 to 6 and the comparative examples 1 to 3.

For the examples 1 to 6 and the comparative examples 1 and 3, the Ni concentration of the dielectric layer 11 was measured. As described above, in the stacking direction, a region from a location 50 nm away from one internal electrode layer 12 and to a location 50 nm away from the other internal electrode layer 12 was virtually divided into five equal regions. The width in the direction perpendicular to the stacking direction was made to be 1.2 times the thickness of the dielectric layer, and the Ni concentrations in the obtained five measurement regions were measured. The two adjacent internal electrode layers 12 overlap each other in plan view as effective electrodes across the entire surfaces of both end faces in the stacking direction of each measurement region.

For the measurement of the Ni concentration, a TEM-EDS (TEM JEM-2100F manufactured by JEOL Ltd.) and an EDS detector (JED-2300T manufactured by JEOL Ltd.) were used. Samples for measurement were made by mechanically polishing (polishing in a plane normal to the internal electrode layer) a reoxidized multilayer ceramic capacitor and thinning the polished multilayer ceramic capacitor by ion milling. Samples with a thickness of 0.05 μm were made so that five measurement regions could be measured. Each measurement region was scanned and measured with a probe diameter of 1.5 nm, and the Ni concentration in each measurement region was measured. To measure the Ni concentration, the Ni concentration was calculated from an STEM-EDS spectrum using the JED Series Analysis Program manufactured by JEOL Ltd. as described above. When the Ni concentration in each of the five measurement region was within ±20% of the average of the Ni concentrations of the measurement regions, the Ni concentration of the dielectric layer 11 in the ceramic capacitor was considered to be uniform. In the multilayer ceramic capacitor 100, when the Ni concentrations of at least four dielectric layers 11 of different five dielectric layers 11 were uniform, the Ni concentration of the overall dielectric layer in the stacking direction of the multilayer ceramic capacitor 100 was considered to be uniform.

In a crystal grain, the Ni concentration was measured in a 50-nm square region by a TEM-EDS (TEM JEM-2100F manufactured by JEOL Ltd.) and an EDS detector (JED-2300T manufactured by JEOL Ltd.). In a crystal grain boundary, for example, ten points on the crystal grain boundary adjacent to the crystal grain were measured with a 1.5 nm probe by using a TEM-EDS (TEM JEM-2100F manufactured by JEOL Ltd.) and an EDS detector (JED-2300T manufactured by JEOL Ltd.), and the average of the obtained Ni concentrations was measured as the Ni concentration of the crystal grain boundary. When the Ni concentration in the crystal grain was within ±20% of the Ni concentration of the crystal grain boundary measured as described above, both Ni concentrations were considered equal. When the Ni concentration in a crystal grain was equal to the Ni concentration of the crystal grain boundary adjacent to the crystal grain in at least four of five different dielectric layers 11, the Ni concentration in a crystal grain and the Ni concentration of the crystal grain boundary adjacent to the crystal grain were considered equal across the multilayer ceramic capacitor 100.

Analysis

Figure 6:
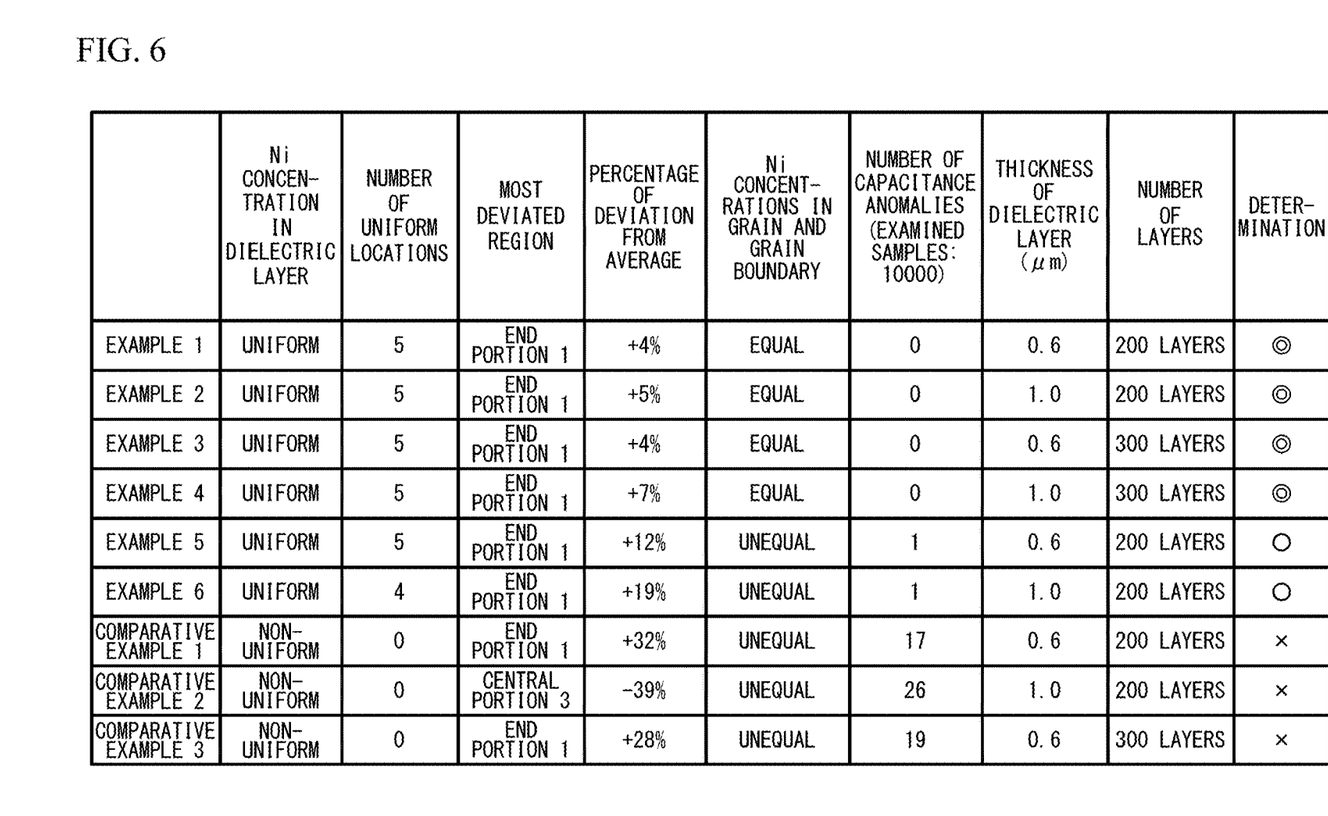
FIG. 6 illustrates examples and comparative examples.

FIG. 6 presents whether the Ni concentration is uniform or non-uniform. As presented in FIG. 6, in the examples 1 to 6, the Ni concentration of the overall dielectric layer 11 in the stacking direction of the multilayer ceramic capacitor 100 was uniform. In the comparative examples 1 to 3, the Ni concentration of the dielectric layer in the stacking direction of the multilayer ceramic capacitor 100 did not become uniform. In FIG. 6, the number in the column "number of uniform locations" presents the number of locations in which the Ni concentration was judged to be uniform in five different locations at which the dielectric layer was measured. The column of "most deviated region" represents the location of the measurement region of which the Ni concentration deviated from the average the most among the measured regions in accordance with FIG. 3. In the example 6, the region where the Ni concentration was uniform is presented. The column of "percentage of deviation from average" presents the percentage of the deviation when the Ni concentration deviated from the average the most in the measured Ni concentrations. In the examples 1 to 6, presented is the percentage of the deviation when the Ni concentration deviated from the average the most among the dielectric layers of which the Ni concentrations were uniform.

In the examples 1 to 4, the Ni concentration in a crystal grain were equal to the Ni concentration of the crystal grain boundary adjacent to the crystal grain across the multilayer ceramic capacitor 100. This is considered because the calcination time of the second calcination process was two hours in the examples 5 and 6 while the calcination time of the second calcination process was three hours in the examples 1 to 4 through the comparison with the manufacturing condition of the examples 5 and 6 in which the Ni concentration in a crystal grain did not become equal to the Ni concentration of the crystal grain boundary adjacent to the crystal grain. It is considered that the Ni concentration in a crystal grain and the Ni concentration of the crystal grain boundary in the dielectric layer became equal to each other by increasing the time of the second calcination process in the examples 1 to 4. The diffusion of Ni mainly proceeds in the second calcination process, and the diffusion is likely to proceed especially in the form of nickel oxide (NiO). The oxygen partial pressure in the second calcination process of the examples 1 to 6 was at the level of $10^{-5}$ Pa, and this condition is considered a condition that Ni is easily diffused because the atmosphere is an atmosphere in which nickel oxide is easily produced.

The variability in capacitance was examined. Capacitances of 10000 samples were measured for each of the examples 1 to 6 and the comparative examples 1 to 3, and the number of samples of which the capacitance differs from the average by ±20% or more was examined. The result is presented in FIG. 6. The number of capacitance anomalies presented in FIG. 6 is the number of samples of which the capacitance differed from the average by ±20% or more in 10000 samples. All the capacitance anomalies that occurred in this inspection were capacitance anomalies that the capacitance differed from the average by −20% or more. The double circle represents that the number of capacitance anomalies is zero, the circle represents that the number of capacitance anomalies is one, and the cross mark represents that the number of capacitance anomalies is two or greater. In any of the examples 1 to 6, the number of capacitance anomalies is small. This is considered because the Ni concentrations in the stacking direction of the five measurement regions of the dielectric layer 11 became uniform, the decrease in permittivity is inhibited, and thereby the capacitance of the multilayer ceramic capacitor 100 stabilized. In contrast, in the comparative examples 1 to 3, the number of capacitance anomalies increased. This is considered because since the Ni concentration of the dielectric layer 11 in the stacking direction did not become uniform, the decrease in permittivity could not be inhibited and the capacitance of the multilayer ceramic capacitor did not stabilize.

Moreover, in the examples 1 to 4, the number of capacitance anomalies further decreased compared to the examples 5 and 6. This is considered because the Ni concentration in a crystal grain and the Ni concentration of the crystal grain boundary adjacent to the crystal grain became equal across the multilayer ceramic capacitor 100 and thereby the capacitance of the multilayer ceramic capacitor 100 further stabilized.

To sufficiently promote the diffusion of Ni, the thickness of the dielectric layer 11 is preferably small. Thus, the dielectric layer 11 preferably has a thickness of 1.0 μm or less. On the other hand, from the viewpoint of withstand voltage, the thickness of the dielectric layer 11 is preferably large. Thus, the dielectric layer 11 preferably has a thickness of 0.6 μm or greater.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a pair of external electrodes;
a first internal electrode that contains nickel and is coupled to one of the pair of external electrodes;
a dielectric layer that is stacked on the first internal electrode and contains a ceramic material and nickel, the ceramic material including barium and titanium; and
a second internal electrode that is stacked on the dielectric layer, contains nickel, and is coupled to another one of the pair of external electrodes, wherein
a concentration of nickel in each of five regions is within ±20% of an average of the concentrations of nickel in the five regions, the concentration of nickel being an atomic concentration ratio of nickel to barium and titanium, each of the five regions including nickel, the five regions being obtained by dividing a region of the dielectric layer equally into five in a stacking direction, the region of the dielectric layer being located from a location 50 nm away from the first internal electrode to a location 50 nm away from the second internal electrode in the stacking direction between the first internal electrode and the second internal electrode, and
the region located from the location 50 nm away from the first internal electrode to the location 50 nm away from the second internal electrode includes both a crystal grain of the ceramic material and a crystal grain boundary of the crystal grain.

2. The multilayer ceramic capacitor according to claim 1, wherein
the concentration of nickel in each of the five regions is within ±10% of the average of the concentrations of nickel in the five regions.

3. The multilayer ceramic capacitor according to claim 1, wherein
the concentration of nickel in each of the five regions is within ±5% of the average of the concentrations of nickel in the five regions.

4. The multilayer ceramic capacitor according to claim 1, wherein
a concentration of nickel in at least one crystal grain of the ceramic material is within ±20% of a concentration of nickel of a crystal grain boundary adjacent to the any crystal grain in the dielectric layer.

5. The multilayer ceramic capacitor according to claim 1, wherein
the ceramic material is $BaTiO_3$.

6. The multilayer ceramic capacitor according to claim 1, wherein
a plurality of dielectric layers are stacked across an internal electrode, and
80% or more of the plurality of dielectric layers are the dielectric layer.

7. The multilayer ceramic capacitor according to claim 1, wherein the concentration of nickel is measured by TEM (Transmission Electron Microscope).

* * * * *